United States Patent [19]

Korniat et al.

[11] Patent Number: 5,972,101

[45] Date of Patent: Oct. 26, 1999

[54] CHIPABLE MINERAL COMPOSITION FOR AN EXCAVATION TOY INCLUDING A BURIED OBJECT

[76] Inventors: Michael Korniat, 18 Glenview Avenue, Winnipeg, Manitoba, Canada, R2M 1W2; Michael Murphy; Derrick Andries, both of 816 Jubilee Avenue, Winnipeg, Manitoba, Canada, R3L 1P9; Liberato Bertone, 99 Crawford Avenue, Winnipeg, Manitoba, Canada, R2H 1X6; Kevin Conlin, Box 400, Wawanesa, Manitoba, Canada, R0K 2G0

[21] Appl. No.: 08/659,940

[22] Filed: Jun. 7, 1996

[51] Int. Cl.$^6$ ..................................... C04B 28/24
[52] U.S. Cl. .................. 106/622; 106/631; 106/634; 106/636; 106/272
[58] Field of Search ..................... 106/622, 631, 106/636, 272, 634; 446/491

[56] References Cited

U.S. PATENT DOCUMENTS

| 430,766 | 6/1890 | Boxer | 106/622 |
|---|---|---|---|
| 621,797 | 3/1899 | Curtis | 106/622 |
| 1,136,980 | 4/1915 | Thoma | 106/622 |
| 2,475,781 | 7/1949 | Gallup | 106/622 |
| 4,398,960 | 8/1983 | Murray | 106/738 |
| 5,358,554 | 10/1994 | Seymour et al. | 106/622 |

OTHER PUBLICATIONS

Ramachandran, "concrete admixtures handbook, properties, science and technology", Noyes Publications, New Jersey, p. 518 1984.

*Primary Examiner*—Michael Marcheschi
*Attorney, Agent, or Firm*—Adrian D. Battison; Murray E. Thrift

[57] ABSTRACT

A composition with the required chipping characteristics can be formed into a solid block surrounding objects to be exposed by chipping away the material of the block to define a paleontology or similar toy. The composition contains rounded granite particles of two different mesh sizes, a wax filler material in the interstices between the particles and a separate binder to form the structure into a solid block.

10 Claims, 1 Drawing Sheet

CHIPABLE MINERAL COMPOSITION FOR AN EXCAVATION TOY INCLUDING A BURIED OBJECT

BACKGROUND OF THE INVENTION

This invention relates to a composition of mainly mineral materials which can be formed into a solid block for encasing objects which can be recovered by chipping the material of the block to expose the objects.

It is already known to provide toys or demonstration models in which objects are encased in a chipable mineral solid material so that the student or child can use suitable tools to carefully chip away the solid mineral material to expose the encased objects.

Although the present invention is particularly concerned with paleontology so that the encased objects are preferably simulated bones or other simulated animal remains, the present invention is riot limited to this type of object and other objects may be similarly encased with the composition to which the present invention is directed.

One previous mineral type composition of this type used in a paleontology toy has been formed by mixing molten wax, chick grit, clay and sand. However this product has been very difficult and dangerous to manufacture in suitable numbers of product and in addition the chipping qualities of the product are somewhat inconsistent. Another relatively crude product of this type has simply used a solid wax to surround the objects but this does not have the mineral simulation to the type of mineral found in nature. In another arrangement, a clay substance can be scraped from the underlying objects but this is very dusty and therefore unacceptable as a toy in most homes.

It will be appreciated that the chipping characteristics of the solid material must be such that the material breaks down into relatively small pieces to provide a relatively slow rate of breakdown of the block, without crumbling to dust, and without those pieces being broken off with high velocity in the chipped parts generated by high impact forces necessary to split off the chipped parts.

SUMMARY OF THE INVENTION

It is one object of the present invention, therefore, to provide an improved composition and an improved method of manufacturing the composition.

According to one aspect of the invention there is provided a A composition comprising: a first particulate mineral material having particles sized to a mesh size in the range 8 to 30 mesh; a second particulate mineral material having particles sized to a mesh size in the range 8 to 30 mesh; the mesh size of the first particulate material being of a higher number than the mesh size of the second particulate material; a non-particulate filler material in interstices between the particles of the first and second particulate materials; and a binder acting to bind the first and second particulate materials and the filler into a solid block.

Preferably the first and second particulate materials are formed from the same mineral, particularly granite, wherein preferably the particles of the first and second particulate materials are rounded so that sharp points thereof are removed.

Preferably, of the total amount of the first and second particulate materials, by weight, the first particulate material makes up between 20 to 40 percent and the second particulate material makes up between 60 to 80 percent.

Preferably, of the total amount of the first and second particulate materials, by weight, the first particulate material makes up of the order of 30 percent and the second particulate material makes up of the order of 70 percent.

Preferably the particles of the first material are sized to 12 mesh and wherein the particles of the second material are sized to 18 mesh.

Preferably the filler material is a wax and makes up 0.7 to 4.2 percent of the total weight of the composition.

The binder and the filler material are non toxic and preferably the binder is sodium silicate which is activated by a catalyst.

According to a second aspect of the invention there is provided a composition comprising, by weight: a first particulate mineral material having particles sized to a mesh size in the range 12 to 30 mesh; a second particulate mineral material having particles sized to a mesh size in the range 12 to 30 mesh; the mesh size of the first particulate material being sized to a higher mesh number than that of the second particulate material and the second particulate material making up the majority of the particulate materials; between 0.7 and 4.2 percent of a non toxic wax filler material in interstices between the particles of the first and second particulate materials; and between 2 and 7 percent of a non toxic binder acting to bind the first and second particulate materials and the wax filler into a solid block.

According to a third aspect of the invention there is provided a method of forming a composition comprising: providing by weight: a first particulate mineral material having particles sized to a mesh size in the range 12 to 30 mesh; a second particulate mineral material having particles sized to a mesh size in the range 12 to 30 mesh; between 0.7 and 4.2 percent of a non toxic wax filler material; and between 2 and 7 percent of a non toxic binder; the mesh size of the first particulate material being sized to a higher mesh number than that of the second particulate material and the second particulate material making up the majority of the particulate materials; the wax filler material being supplied as an emulsion in water; intimately mixing the first and second particulate materials and the wax filler material in emulsion so that the wax filler material enters into interstices between the particles of the first and second particulate materials; and activating the binder with a catalyst to bind the first and second particulate materials and the wax filler material into a solid block.

One embodiment of the invention will now be described in conjunction with the accompanying drawings in which:

DETAILED DESCRIPTION

Figure 1:
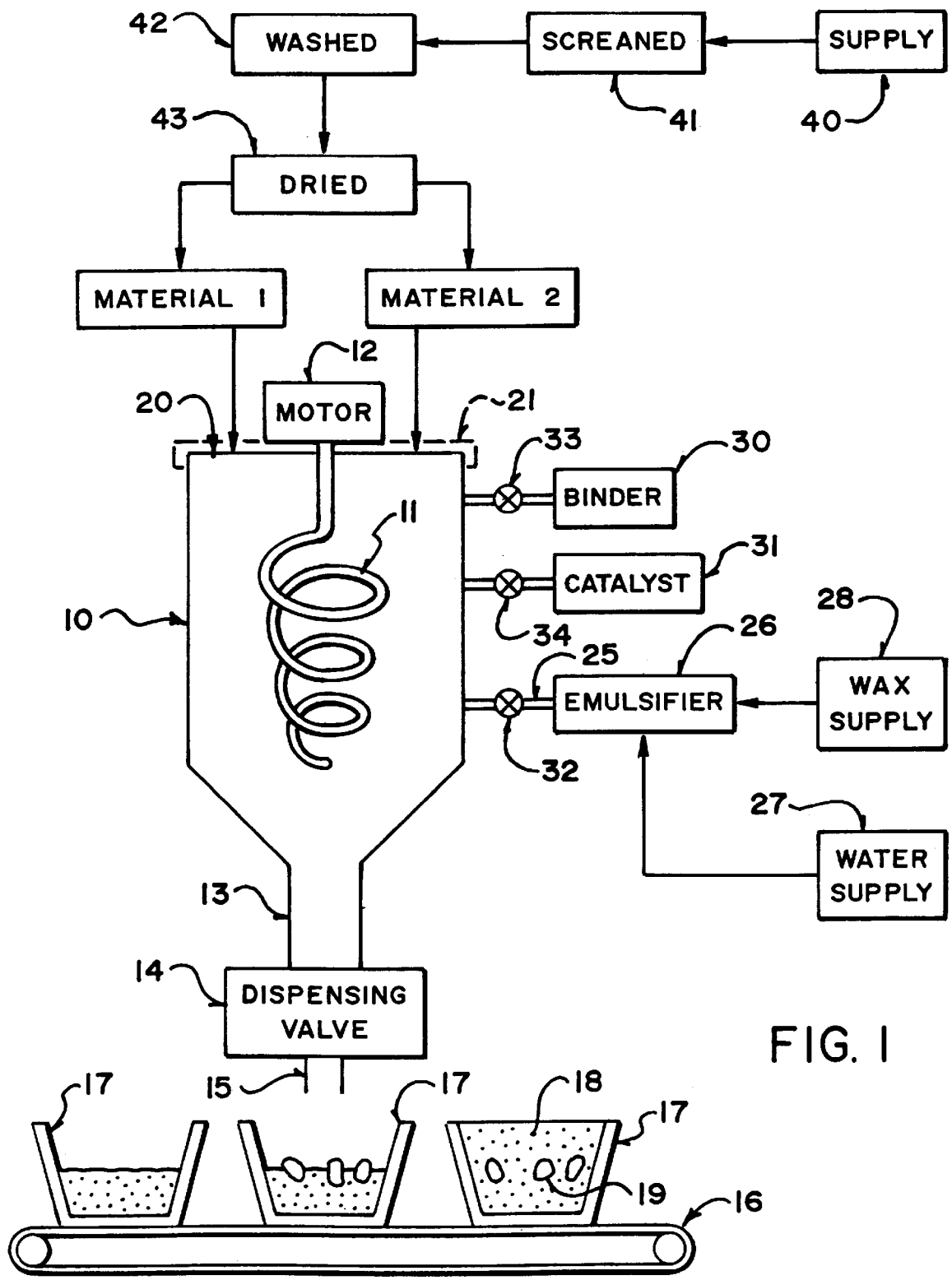
FIG. 1 is a schematic illustration of the process for manufacturing the chipping composition and for molding that composition to encase the objects to be exposed.

The process includes providing a mixing chamber 10 having a mixing beater 11 driven by a motor 12. The chamber 10 has a dispensing duct 13 at a lower end with a controlling dispensing valve 14 in the duct leading to a dispensing nozzle 15.

A conveyor 16 carries a plurality of molds 17 each for molding a solid block 18 of the chipping composition containing objects 19 such as simulated bones.

The mixing chamber includes an open top 20 which can be closed by a cover 21 so that the previously described materials indicated at material 1 and material 2 can be fed into the mixing chamber 10 for mixing with the additional components of the composition.

The additional components include a first supply duct 25 leading from an emulsifier 26 supplied firstly with water from a water supply 27 and with solid wax from a wax supply 28. The emulsifier 26 acts to mix the water and wax to form an emulsion with the emulsion carrying substantially the maximum quantity of wax which can be emulsified which is of the order of 30% water to 70% wax.

The process further includes a supply of a binder generally indicated at 30 and supply of a catalyst generally indicated at 31. The supplies from the emulsifier 26, the binder 30 and the catalyst 31 are controlled by valves 32, 33 and 34 respectively so that the required quantity of the respective material can be injected into the container 10 in a batch process with a predetermined quantity of the materials 1 and 2.

The materials 1 and 2 are supplied from a supply 40 of granite which is screened to provide the required size particles for the materials 1 and 2 in the screening processing generally indicated at 41. It is washed to remove smaller particles in a process indicated at 42 and is dried in the process indicated at 43. The process of screening, washing and drying the granite particles is of course well known and does not need description herein. The drying is important or the materials will not effectively bond.

The supply 40 is selected from particles which are rounded that is they have been agitated sufficiently to remove sharp corners and again this is a process well known in the art.

The materials 1 and 2 are therefore comprised of substantially wholly granite which has been screened for the particles lie in the range 8 to 30 mesh. In effect two or more particle sizes are then selected for the materials 1 and 2. In material 1 is selected to have a larger mesh size than the material 2.

For example, the mineral amounts can lie in the following ranges:

60 to 70% 8 to 16 mesh
18 to 26% 16 to 20 mesh
7 to 15% 20 to 30 mesh
3% over 30 mesh The amount of the particles from materials 1 and 2 is selected so that the first material having the larger particles forms a portion in the range 18 to 37% of the total finished mixture and preferably of the order of 28%. The amount of the material 2 is arranged so that it lies in the range 53 to 75% of the total finished mixture and preferably of the order of 66%.

The binder is non-toxic so that it cannot damage a student or child if inadvertently inhaled, ingested or otherwise absorbed. Sodium silicate provides a suitable binder and can be supplied in the range 1.75 to 7% and preferably of the order of 4% of the total finished product.

Other suitable binders also can be used, not including conventional bake resins which are toxic.

The sodium silicate or other binder is activated by a known catalyst which is readily available. The proportion of catalyst can be varied in accordance with the required set up time in the range 5 to 15% of the total binder amount including the catalyst.

The emulsion from the emulsifier 26 is supplied in an amount so that the wax in the finished product lies in the range 0.7 to 4.2% of the total finished product and preferably of the order of 1.22%, that is the amount of the emulsion prior to evaporation of the water lies in the range 1.5 to 6% and preferably of the order of 1.75%. The water normally evaporates in the drying and setting process so that the wax remains in the interstices between the particles in the finished product. The wax used is food grade wax.

In a batch process, therefore, the materials are supplied in the proportion set forth above and the mixture is intimately mixed so that the particles are intermixed and the emulsified wax is intimately mixed into the interstices between the particles. The binder is also mixed into the mixture along with a catalyst to form a pourable mixture which is discharged through the valve 14 into a first one of the molds. The amount discharged initially is approximately ½ of the height of the mold. In a second step the objects 19 are inserted into the mold by slight pressure into the top surface of the mixture firstly poured into the mold. Subsequently the mold is filled with a second application of the mixture and the mold vibrated to settle the material and to remove voids. The material is then packed with a board and any excess is scraped off the top of the mold. The mixture is then allowed to set up and dry for a period of time, usually in the range 0.66 to 1.0 hours, which depends upon the proportion of catalyst selected. When set the mold is inverted and the solid blocks so formed caused by the setting of the binder is extracted from the inclined side walls of the mold and the block is packaged for sale.

The cooperation of the different size particles with the wax which enters the interstices between the particles together with the binder which is separate from the wax and acts to hold the structure together provides a non-toxic solid block containing the objects to be exposed with the required chipping characteristics. The wax also keeps the block from drying out and gives the material an attractive shine. The mixture can be readily collated and mixed to form a stable material with the set up time adjustable to match the filling times to the batch size. The use of the wax in emulsion is important so that no heat is involved in the mixing process. Also the emulsion distributes easily throughout the mineral material and when the block is set prevents the mineral materials from sticking in clumps.

The composition therefore is formed substantially wholly by the two materials containing the different particle sizes with those particles being relatively large in comparison with sand or clay, silica sand usually lies in the range 66 to 80 mesh and clay in the range 100 to 120 mesh. The structure is therefore basically free from such silica sand or clay so that it forms little dust of very small particles when chipped thus providing an enhanced chipping action avoiding the undesirable, inhalable dust.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A chipable composition for use in a toy for excavating a recoverable object buried in the composition comprising:
   a particulate mineral material having particles sized to a mesh size in the range up to 30 mesh;
   a non-toxic wax filler material in interstices between the particles of the particulate material, the amount of the wax material being greater than zero but less than 4.2 percent of a total weight;
   and a non-toxic binder acting to bind the particulate materials and the filler into a solid block, the binder being used in an amount such that the composition can be manually chipped away from an embedded object to expose the object to be recovered from the composition, the amount of the binder being greater than zero but less than 7 percent of the total weight.

2. The composition according to claim 1 wherein the particulate material is granite.

3. The composition according to claim 1 wherein the particles are rounded so that sharp points thereof are removed.

4. The composition according to claim 1 wherein the binder is sodium silicate which is activated by a catalyst.

5. The composition according to claim 1 wherein the particulate material is sized such that greater than 85 percent of the particulate material is less than 20 mesh.

6. A method of forming a chipable composition for use in a toy for excavating a recoverable object buried in the composition, the method comprising:

provinding a particulate mineral material having particles sized to a mesh size in the range up to 30 mesh;

providing a non-toxic wax filler material, the amount of the wax material being greater than zero but less than 4.2 percent of a total weight of the composition;

providing a non-toxic binder, the amount of the binder being greater than zero but less than 7 percent of the total weight;

the wax filler material being supplied as an emulsion in water;

intimately mixing the particulate material and the wax filler material emulsion so that the wax filler material enters into interstices between the particles of the particulate material;

and activating the binder with a catalyst to bind the particulate materials and the wax filler material into a solid block, the binder being used in an amount such that the composition can be manually chipped away from an embedded object to expose the object to be recovered from the composition.

7. The method according to claim 6 wherein the particulate material is granite.

8. The method according to claim 6 wherein the particles are rounded so that sharp points thereof are removed.

9. The method according to claim 6 wherein the binder is sodium silicate which is activated by a catalyst.

10. The method according to claim 6 wherein the particulate material is sized such that greater than 85 percent of the particulate material is less than 20 mesh.

* * * * *